(12) United States Patent
Björkholtz

(10) Patent No.: US 12,508,924 B2
(45) Date of Patent: Dec. 30, 2025

(54) DRIVE ASSEMBLY FOR AN ELECTRIC VEHICLE AND METHOD FOR OPERATING A DRIVE ASSEMBLY

(71) Applicant: Volvo Car Corporation, Gothenburg (SE)

(72) Inventor: Jonas Björkholtz, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 324 days.

(21) Appl. No.: 18/311,652

(22) Filed: May 3, 2023

(65) Prior Publication Data

US 2023/0373321 A1 Nov. 23, 2023

(30) Foreign Application Priority Data

May 19, 2022 (EP) ..................................... 22174458

(51) Int. Cl.
*B60L 50/51* (2019.01)
*H02P 25/18* (2006.01)
*H02P 27/06* (2006.01)

(52) U.S. Cl.
CPC ............ *B60L 50/51* (2019.02); *H02P 25/184* (2013.01); *H02P 27/06* (2013.01); *B60L 2210/42* (2013.01); *B60L 2240/547* (2013.01)

(58) Field of Classification Search
CPC .................. B60L 50/51; B60L 2210/42; B60L 2240/547; H02P 25/184; H02P 27/06
See application file for complete search history.

(56) References Cited

U.S. PATENT DOCUMENTS

| 10,525,836 | B2 | 1/2020 | Tang et al. |
| 10,618,424 | B2 | 4/2020 | Joseph et al. |
| 2013/0096760 | A1* | 4/2013 | Izumi ................... H01M 10/48 701/22 |
| 2019/0260319 | A1* | 8/2019 | Gagas ..................... H02P 21/22 |
| 2021/0146791 | A1* | 5/2021 | Hinterberger ......... B60L 15/007 |

FOREIGN PATENT DOCUMENTS

| JP | 2011199974 A | 3/2010 |
| WO | WO-2009070089 A1 * | 6/2009 ............. H02P 25/08 |

OTHER PUBLICATIONS

Extended EP Search Report for EP Application No. 22174458.4 dated Oct. 21, 2022, 9 pages.

* cited by examiner

*Primary Examiner* — Syed O Hasan
(74) *Attorney, Agent, or Firm* — Amin, Turocy & Watson, LLP

(57) ABSTRACT

The disclosure relates to a drive assembly for an electric vehicle and to operation of a drive assembly. The drive assembly can comprise an electric drive machine with three phase strands. The drive assembly can comprise a switching means being configured for selectively switching the three phase strands in a delta configuration or in a star configuration. The drive assembly can also comprise a battery unit, wherein the battery unit comprises a plurality of battery cells and a plurality of cell-level control units. Each of the cell-level control units can be electrically connected to an associated battery cell out of the plurality of battery cells, or to an associated group of battery cells out of the plurality of battery cells, and each of the cell-level control units can comprise a cell-level inverter unit.

20 Claims, 2 Drawing Sheets

DRIVE ASSEMBLY FOR AN ELECTRIC VEHICLE AND METHOD FOR OPERATING A DRIVE ASSEMBLY

CROSS-REFERENCE TO RELATED APPLICATIONS

This application claims the benefit of and priority to pending EP patent application serial number 22174458.4, filed May 19, 2022, and entitled "DRIVE ASSEMBLY FOR AN ELECTRIC VEHICLE AND METHOD FOR OPERATING A DRIVE ASSEMBLY," the entirety of which is hereby incorporated by reference herein.

TECHNICAL FIELD

The present disclosure relates to a drive assembly for an electric vehicle, and to operation of a drive assembly.

BACKGROUND

In the present context, an electric vehicle is a vehicle that is at least partially propelled by an electric motor. The energy for powering the electric motor may be provided by a battery.

Frequently, users of electric vehicles demand that a driving range of the electric vehicle, and the corresponding drive assembly, be extended.

SUMMARY

Examples described herein enable increased driving range without further charging of a corresponding vehicle.

It is an objective of the present disclosure to improve drive assemblies for electric vehicles with respect to their driving range. In this regard, a drive assembly is enabled, which is able to provide a comparatively long driving range without intermediate charging.

According to a first aspect, there is provided a drive assembly for an electric vehicle. The drive assembly comprises an electric drive machine with three phase strands. Furthermore, the drive assembly comprises a switching means being electrically connected to the electric drive machine and being configured for selectively switching the three phase strands in a delta configuration or in a star configuration. Additionally, the drive assembly comprises a battery unit being electrically connected to the electric drive machine via the switching means. The battery unit comprises a plurality of battery cells and a plurality of cell-level control units, wherein each of the cell-level control units is electrically connected to an associated single battery cell out of the plurality of battery cells or to an associated group of battery cells out of the plurality of battery cells. Moreover, each of the cell-level control units comprises a cell-level inverter unit being configured to transform a direct current being provided by the associated battery cell or the associated group of battery cells into an alternating current (AC) of adjustable voltage. In the present context, a phase strand may also be designated as a phase winding. Thus, using a cell-level control unit, a corresponding single battery cell or group of battery cells can be used for providing alternating current of adjustable voltage. The frequency, phase and amplitude of this AC current can be determined using the cell-level inverter, e.g., on cell level. In this context, the adjustable voltage is, for example, an effective voltage or a root mean square voltage. The cell-level control units and the corresponding battery cells are interconnected such that each of the three phase strands of the electric drive machine can be supplied with an appropriate AC signal. Consequently, using the cell-level control units, the battery unit is able to provide an AC current and/or an AC voltage of variable characteristics, e.g., with respect to the frequency, phase, and amplitude. By operating the cell-level control units, the characteristics can be adjusted as needed. This stands in contrast to a traditional setup of a drive assembly comprising a battery unit which is only able to provide a substantially constant voltage.

Using the adjustability of the AC current and the AC voltage, the different characteristics of the delta configuration and the star configuration of the three phase strands can be used. In this regard, when switching from the delta configuration to the star configuration, the phase current can be reduced. If the power is to be maintained, of course the phase voltage needs to be increased accordingly. In a three phase electric machine, the phase current is reduced by a factor of $1/\sqrt{3}$ and the phase voltage is increased by a factor of $\sqrt{3}$. Since the electric losses inside a drive assembly are strongly dependent on the phase current, these losses can be reduced by selectively operating the three phase strands in a star configuration. Reducing the losses increases the operational efficiency. This leads to an increased driving range.

Due to the above-described effects, a configuration of the drive assembly in which the three phase strands are in a star configuration can be designated as an energy saving mode.

An electric machine having three phase strands may be called a three phase AC electric machine.

It is noted that the inverter unit comprises H-bridges. For this reason, the inverter unit may alternatively be referred to as an H-bridge unit.

In an example, each of the cell-level control units may comprise two connection terminals for the connection of the cell-level control units among each other. These connection terminals may be separate from connection terminals by which the single battery cell or the group of battery cells is connected to the respective cell-level control unit.

In an example, each cell-level control unit may comprise a H-bridge. An H-bridge is an H-shaped circuit, wherein a switch is located in each of the four legs of the H-shape. The switches may be realized by transistors. The connection terminal for connecting the cell-level control units among each other may be arranged in a middle section of the H-shaped circuit. In such a configuration, each of these connection terminals may be connected to a positive pole of the respective battery cell or group of battery cells via a first switch and to a negative pole of the respective battery cell or group of battery cells via a second switch. Depending on the switching states of the switches, the cell-level control unit may be in a state in which a polarity of a connectable battery cell or group of battery cells may be maintained. In a different state, the polarity of the battery cell or the group of battery cells may be inverted by the switching unit of the cell-level control unit. Depending on the manner of operating the switches, a DC current or an AC current may be provided. In this regard, the switching unit may be operated as an inverter. Moreover, a switching state is possible where the battery cell or the group of battery cells being connectable to the cell-level control unit is bypassed. In a further alternative state, the connection terminals for connecting the single battery cell or the group of battery cells is electrically disconnected from the cell-level control unit. The switching unit comprises a control unit for operating the switches.

In an example, the plurality of battery cells and the corresponding cell-level control units are arranged in a number of battery cell strings. The number of battery cell strings corresponds to the number of phase strands of the electric drive machine. In each battery cell string, the battery cells and the corresponding cell-level control units are electrically connected in series. Consequently, electric power having an appropriate voltage can be supplied to each of phase strands of the electric drive machine. The configuration in a number of battery cell strings is both efficient from the point of view of electric connections and space saving.

In an example, each of the battery cell strings has a first end and a second end. The second ends are arranged opposite to the respective first end. Moreover, all first ends are electrically connected to the switching means and/or all second ends are electrically connected to each other at a neutral point. Thus, the second ends may be called neutral sides of the respective cell strings and the first ends may be called phase sides or voltage sides. At the neutral point, the sum of currents is zero. This is a structurally simple and functional configuration of the battery cell strings.

In an example, each of the battery cell strings comprises 1 to 500 battery cells. By adapting the number of battery cells, a battery capacity being associated with the corresponding battery cell string can be adapted. The same can apply to a voltage and a current, which can be provided by the battery cell string. Consequently, the battery cell string can be adapted to a great variety of possible applications.

According to a second aspect, there is provided a method for operating a drive assembly according to the present disclosure. The method comprises:

operating the drive assembly in a first operational mode, wherein the first operational mode comprises connecting the phase strands of the electric drive machine in a delta configuration by using the switching means and providing a first set of alternating currents of a first voltage to the electric drive machine by the battery unit, or operating the drive assembly in a second operational mode, wherein the second operational mode comprises connecting the phase strands of the electric drive machine in a star configuration by using the switching means and providing a second set of alternating currents of a second voltage to the electric drive machine by the battery unit.

In this context, a set of alternating currents refers to all the alternating currents being provided to the different phase strands of the electric drive machine. In various examples, the first voltage and the second voltage are different from one another. The first voltage and the second voltage may be effective or root mean square values. If it is assumed that both the first operational mode and the second operational mode use the same electric power, in the operational mode in which the higher voltage is used, a current needs to be reduced. Since the electric losses inside a drive assembly are strongly dependent on the phase current, these losses can be reduced by selectively operating the phase strands in a star configuration, e.g., in the second operational mode. Reducing the losses increases the operational efficiency. This leads to an increased driving range.

In an example, providing a first set of alternating currents of a first voltage and/or providing a second set of alternating currents of a second voltage comprises electrically connecting a sub-set of the plurality of battery cells to the electric drive machine. In this regard, fewer than all battery cells are used. In such a case, the sub-set of the used battery cells need to be operated such that they provided the required voltage and power. This can be facilitated using the corresponding cell-level control units.

In an example, providing a first set of alternating currents of a first voltage and/or providing a second set of alternating currents of a second voltage comprises electrically connecting all battery cells of the plurality of battery cells to the electric drive machine. Thus, in this case, all battery cells and all corresponding cell-level control units with the corresponding cell-level inverters are operated in a coordinated manner.

In an example, both in the first operational mode and in the second operational mode, the electric drive machine is operated at the same load point. Thus, if a mode switch leads to a reduced current, the voltage needs to be increased accordingly. In a case in which the mode switch leads to an increased current, the voltage needs to be decreased. This also applies, vice-versa, if the mode switch leads to an increased or decreased voltage.

In an example, the first operational mode is a default operational mode.

In an example, a ratio between the first voltage and the second voltage is 1.5 to 2. The preferred ratio for a three phase machine can be $\sqrt{3}$.

In an example, the method further comprises using the second operational mode. The star configuration of the second operational mode leads to a comparatively low phase current. This leads to a reduction of electric losses and, thus, to an increased driving range. The second operational mode may, thus, also be designated as an energy saving mode. The use of the second operational mode is possible if the number of cells in each string is higher than what is needed for operating the drive assembly in the first operational mode.

In an example, a user of the electric vehicle may manually choose the operational mode. Alternatively, or additionally, the operational mode may be chosen automatically by a corresponding control unit of the vehicle.

It is be noted that the above examples can be combined with each other irrespective of the aspect involved. Accordingly, the method may be combined with structural features and, likewise, the drive assembly may be combined with features described above with regard to the method.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

DETAILED DESCRIPTION

The figures are merely schematic representations and serve only to illustrate examples of the disclosure. Identical or equivalent elements are in principle provided with the same reference signs.

Figure 1:
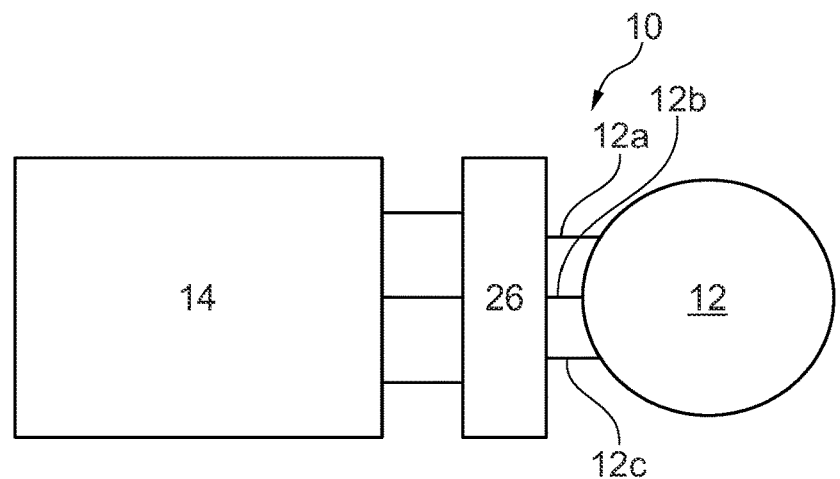
FIG. 1 shows a drive assembly according to the present disclosure which may be operated using a method for operating a drive assembly according to the present disclosure.

FIG. 1 shows a drive assembly 10 for an electric vehicle.

Figure 2:
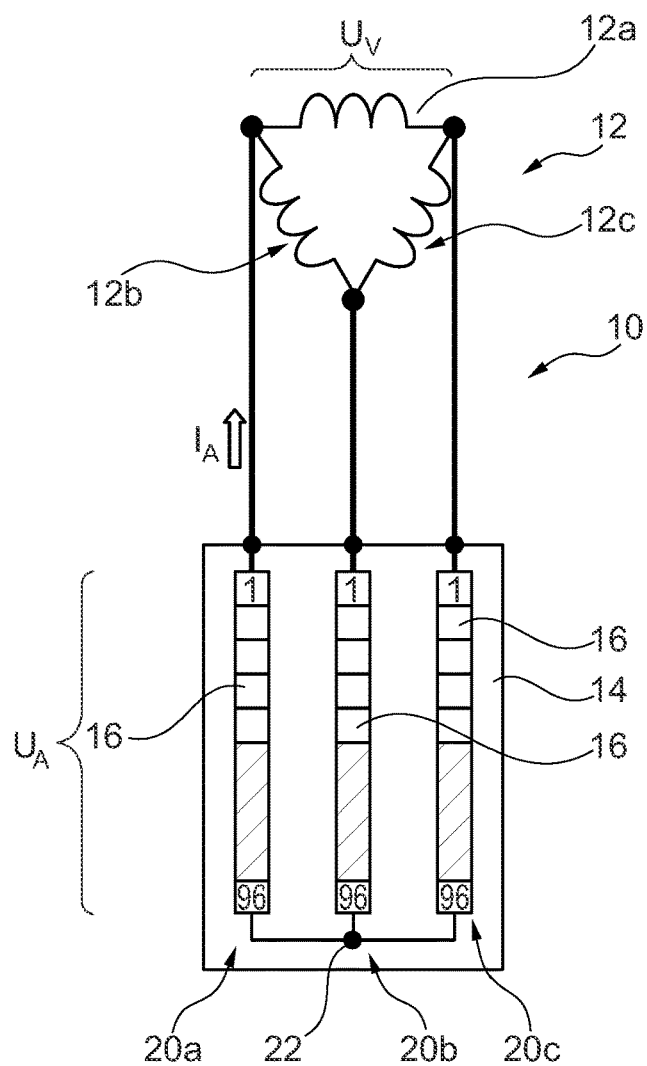
FIG. 2 shows the drive assembly of FIG. 1 from an electric perspective, wherein phase strands of the electric drive machine are in a delta configuration and wherein a switching means of the drive assembly is not represented.
Figure 3:
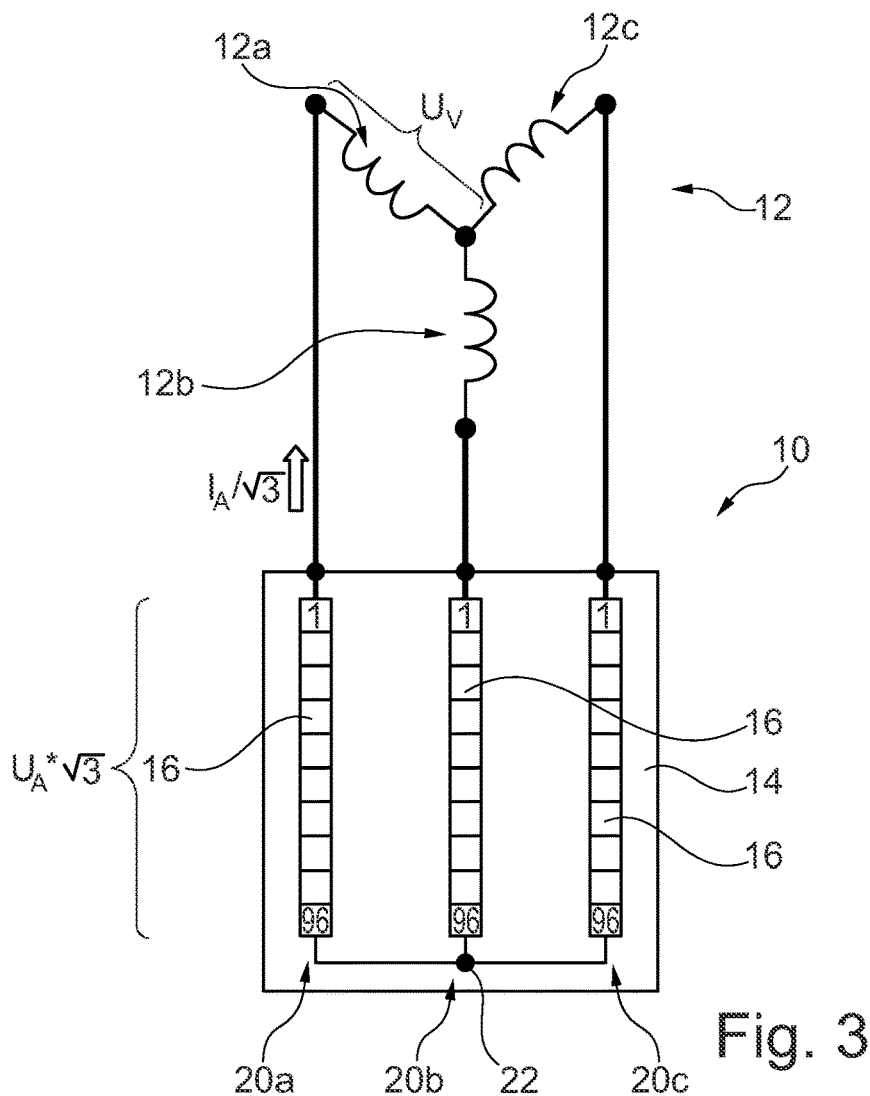
FIG. 3 shows the drive assembly of FIG. 1 from an electric perspective, wherein phase strands of the electric drive machine are in a star configuration and wherein a switching means of the drive assembly is not represented.

The drive assembly 10 comprises an electric drive machine 12 which has three phase strands 12a, 12b, 12c in the present example (see also FIGS. 2 and 3). Thus, the electric drive machine 12 is a three phase AC electric machine.

The electric drive machine 12 may be a synchronous machine.

In order to provide the necessary electric power to the electric drive machine 12, the drive assembly 10 comprises a battery unit 14.

The battery unit 14 is electrically connected to the electric drive machine 12.

The battery unit 14 comprises a plurality of battery cells 16 and a plurality of cell-level control units 18 which are arranged in a number of battery cell strings 20a, 20b, 20c which corresponds to the number of phase strands 12a, 12b, 12c of the electric drive machine 12.

Thus, in the present example, the battery unit 14 comprises three battery cell strings 20a, 20b, 20c (see also FIGS. 2 and 3).

For reasons of better visibility, only some of the battery cells 16 carry a reference sign.

Each of the battery cell strings 20a, 20b, 20c is electrically connected to one phase strand 12a, 12b, 12c via a corresponding first end of the battery cell string 20a, 20b, 20c.

Each of the battery cell strings 20a, 20b, 20c also comprises a second end which is arranged opposite the corresponding first end.

All second ends are electrically connected to each other at a neutral point 22.

Each of the battery cell strings 20a, 20b, 20c is configured to provide electric power to the associated phase strand 12a, 12b, 12c.

In the example shown in the Figures, each of the battery cell strings 20a, 20b, 20c comprises 96 battery cells 16 which are electrically connected in series.

Figure 4:
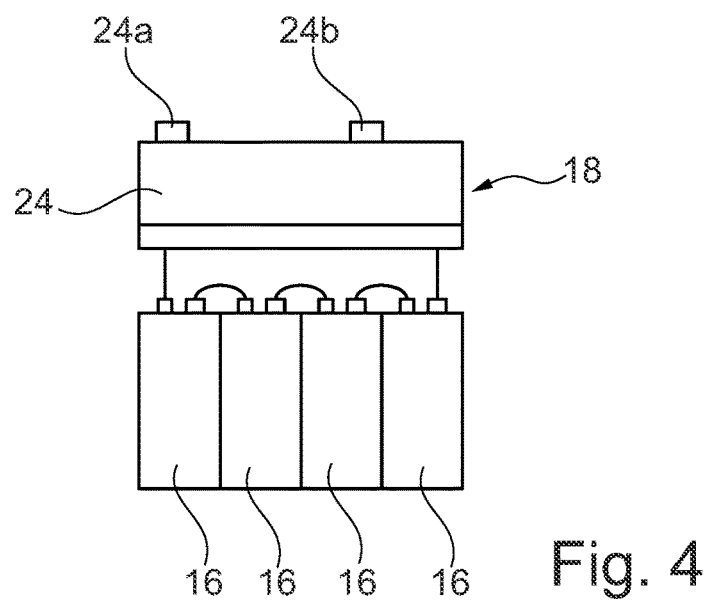
FIG. 4 shows a cell-level control unit and an associated group of battery cells of the drive assembly of FIGS. 1 to 3.

A group of battery cells 16 and a corresponding cell-level control unit 18 is shown in FIG. 4.

In the example shown, the group of battery cells 16 comprises four battery cells 16 which are electrically connected in series. The ends of this electrical series connection are electrically connected to the cell-level control unit 18.

It is noted that, in an alternative in which a single battery cell 16 is electrically connected to an associated cell-level control unit 18, the connection terminals or poles of the battery cell 16 are electrically connected to the cell-level control unit 18.

Each of the cell-level control units comprises a cell-level inverter unit 24 being configured to transform a direct current being provided by the associated battery cell 16 or the associated group of battery cells 16 into an alternating current of adjustable voltage.

To this end and/or other various ends, the cell-level inverter unit 24 uses the DC voltage of the associated group of battery cells 16 as an input voltage.

As an output interface, the cell-level inverter unit 24 has two output terminals 24a, 24b which also serve as the output terminals of the cell-level control unit 18.

Thus, the output terminals 24a, 24b are used for connecting the cell-level control unit 18 and the associated single battery cell 16 or the associated group of battery cells 16 to one or two neighboring cell-level control units 18 within the respective battery cell string 20a, 20b, 20c.

In various examples, the electric connection of the battery unit 14 to the electric drive machine 12 is not direct, instead via a switching means 26.

This means that the switching means 26 is electrically connected to the battery unit 14 and to the electric drive machine 12.

The switching means 26 is configured for selectively switching the three phase strands 12a, 12b, 12c in a delta configuration (cf. FIG. 2) or in a star configuration (cf. FIG. 3).

The electric drive assembly 10 can be operated using a method for operating a drive assembly 10.

According to the method, the drive assembly 10 may be operated in a first operational mode.

In the first operational mode, the phase strands 12a, 12b, 12c of the electric drive machine 12 are connected in a delta configuration by using the switching means 26 (cf. FIG. 2).

In the first operational mode, it is sufficient to just use a sub-set of battery cells 16 of each of the battery cell strings 20a, 20b, 20c. This means that just the battery cells 16 pertaining to the sub-set are electrically connected to the electric drive machine 12. The remaining battery cells 16 are bypassed using the corresponding cell-level control unit 18.

The battery cells 16 of the sub-set of each battery cell string 20a, 20b, 20c provide a voltage being denoted $U_A$.

Using the cell-level control units 18 each of the phase strands 12a, 12b, 12c is provided with an AC signal being characterized by a voltage $U_V$ and a current $I_A$.

These characteristics are to be understood as effective or root mean square values.

Since the delta configuration is called a first operational mode, the alternating currents provided to the phase strands 12a, 12b, 12c of the electric drive machine 12 by the battery unit 14 may be designated as a first set of alternating currents.

In various examples, the first operational mode is a default operational mode.

According to the method, the drive assembly 10 may be operated in a second operational mode.

In various examples, the second operational mode is an alternative to the first operational mode.

In the second operational mode, the phase strands 12a, 12b, 12c of the electric drive machine 12 are connected in a star configuration by using the switching means 26 (cf. FIG. 3).

It is noted that a load point is not altered when switching from the first operational mode to the second operational mode, or vice-versa. Thus, in the first operational mode and in the second operational mode, the electric drive machine 12 is operated at the same load point.

In contrast to the first operational mode, in the second operational mode, all battery cells 16 of all battery cell strings 20a, 20b, 20c are used. This means that all battery cells 16 of the battery unit 14 are electrically connected to the electric drive machine 12.

The battery cells 16 of each battery cell string 20a, 20b, 20c now provide a voltage of $U_A \cdot \sqrt{3}$, e.g., a higher voltage than in the first operational mode.

This has the effect that again, the same voltage $U_V$ can be provided to each of the phase strands 12a, 12b, 12c.

Moreover, in the second operational mode, the current for each connection point of the phase strands 12a, 12b, 12c can be reduced to $I_A/\sqrt{3}$.

As before, the voltage $U_V$ and the current $I_A$ are to be understood as effective or root mean square values.

Since the star configuration is called a second operational mode, the alternating currents provided to the phase strands 12a, 12b, 12c of the electric drive machine 12 by the battery unit 14 may be designated as a second set of alternating currents.

Due to the reduced current in the second operational mode, also the electric losses in the electric drive unit 10 are reduced.

The electric losses may be generally described as a power loss $P_{loss}$ which is a function of the electric resistance R and the current I:

$$P_{loss}=R*I^2$$

In the context of the electric drive assembly 10, the electric resistance is a combination of an internal electric resistance $R_{cells}$ of the battery cells, an electric resistance $R_{inv}$ of the cell-level control units, an electric resistance $R_{cable}$ of the cabling, and an electric resistance $R_{bus}$ of the busbars used in the battery unit 14. Thus, the above equation can be rewritten as:

$$P_{loss}=(R_{cells}+R_{inv}+R_{cable}+R_{bus})*I^2$$

The fact that the losses are reduced increases the overall efficiency of the electric drive assembly 10. Consequently, the second operational mode may be designated as an energy saving mode or an eco-mode.

The electric drive assembly 10 may be triggered to operate in the first or second operational mode by a user. In this regard, the operational mode may be selected manually.

Alternatively, or additionally, the second operational mode may be chosen automatically by a corresponding control unit of the vehicle.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS 10 drive assembly
12 electric drive machine
12a phase strand
12b phase strand
12c phase strand
14 battery unit
16 battery cell
18 cell-level control unit
20a battery cell string
20b battery cell string
20c battery cell string
22 neutral point
24 cell-level inverter unit
24a output terminal
24b output terminal
26 switching means

What is claimed is:

1. A drive assembly for an electric vehicle, comprising:
an electric drive machine comprising three phase strands;
a switching means electrically connected to the electric drive machine and configured for selectively switching the three phase strands in a delta configuration or in a star configuration;
a battery unit electrically connected to the electric drive machine via the switching means, wherein the battery unit comprises a plurality of battery cells and a plurality of cell-level control units, wherein each of the cell-level control units is electrically connected to an associated battery cell out of the plurality of battery cells, or to an associated group of battery cells of the plurality of battery cells, and wherein each of the cell-level control units comprises a cell-level inverter unit configured to transform a direct current being provided by the associated battery cell, or the associated group of battery cells, into an alternating current of adjustable voltage; and
a vehicle control unit that:
executes, via the switching means, the selectively switching of the three phase strands in the delta configuration to operate the electric drive machine at a defined load point using a first subset of battery cells of the battery unit to provide a first voltage and a first current, and
in response to determining a need to extend a driving range of the electric vehicle, executes, via the switching means, the selectively switching of the three phase strands in the star configuration to operate the electric drive machine at the defined load point using a second subset of battery cells of the battery unit to provide a second voltage and a second current, wherein the second subset of battery cells comprises a higher quantity of battery cells than the first subset, the second voltage is higher than the first voltage, and the second current is lower than the first current.

2. The drive assembly of claim 1, wherein the plurality of battery cells and corresponding cell-level control units are arranged in a first defined quantity of battery cell strings, and wherein the first defined quantity of battery cell strings equals a second defined quantity of phase strands of the electric drive machine.

3. The drive assembly of claim 2,
wherein each of the battery cell strings comprises a first end and a second end,
wherein the second end is arranged opposite to the first end, and
wherein all of the first ends are electrically connected to the switching means, or all of the second ends are electrically connected to each other at a neutral point.

4. The drive assembly of claim 2, wherein each of the battery cell strings comprises 1 to 500 battery cells.

5. A method for operating a drive assembly of an electric vehicle, comprising:
operating the drive assembly at a defined load point in a first operational mode, wherein the first operational mode comprises
connecting phase strands of an electric drive machine in a delta configuration by using a switching means, and
providing, via the switching means, a first set of alternating currents of a first voltage to the electric drive machine by a first quantity of battery cells of a battery unit comprising a plurality of battery cells; and
in response to determining a need to extend a driving range of the electric vehicle, operating the drive assembly at the defined load point in a second operational mode, wherein the second operational mode comprises connecting the phase strands of the electric drive machine in a star configuration by using the switching means, and providing a second set of alternating currents of a second voltage to the electric drive machine by a second quantity of battery cells of the battery unit, wherein the second quantity of battery cells is higher than the first quantity of battery cells, the second voltage is higher than the first voltage, and the first set of alternating currents comprise a first current that is higher than a second current of the second set of alternating currents.

6. The method of claim 5, wherein the plurality of battery cells are arranged in a first defined quantity of battery cell strings, and wherein the first defined quantity of battery cell strings equals a second defined quantity of phase strands of the electric drive machine.

7. The method of claim 6, wherein each of the battery cell strings comprises a first end and a second end, wherein the second end is arranged opposite to the first end, and wherein all of the first ends are electrically connected to the switching means, or all of the second ends are electrically connected to each other at a neutral point.

8. The method of claim 6, wherein each of the battery cell strings comprises 1 to 500 battery cells.

9. The method of claim 5, wherein the first operational mode is a default operational mode.

10. The method of claim 5, wherein a ratio between the first voltage and the second voltage is in a range of 1.5 to 2.

11. The method of claim 5, wherein the second quantity of battery cells comprises all of the plurality of battery cells.

12. The method of claim 5, wherein the second quantity of battery cells comprises less than all of the plurality of battery cells.

13. The method of claim 5, wherein the plurality of battery cells comprise respective H-bridges.

14. The method of claim 6, wherein the first defined quantity of battery cell strings comprises three battery cell strings.

15. The method of claim 6, wherein the first defined quantity of battery cell strings comprises more than three battery cell strings.

16. The drive assembly of claim 1, wherein the second subset of battery cells comprises all of the plurality of battery cells.

17. The drive assembly of claim 1, wherein the second subset of battery cells comprises less than all of the plurality of battery cells.

18. The drive assembly of claim 1, wherein the plurality of cell-level control units comprise respective H-bridges.

19. The drive assembly of claim 2, wherein the first defined quantity of battery cell strings comprises three battery cell strings.

20. The drive assembly of claim 2, wherein the first defined quantity of battery cell strings comprises more than three battery cell strings.

* * * * *